United States Patent
Huang et al.

(10) Patent No.: US 9,525,960 B2
(45) Date of Patent: Dec. 20, 2016

(54) SYSTEM AND METHOD FOR IMPROVING NETWORK ACCESS IN MACHINE TO MACHINE COMMUNICATION

(75) Inventors: Rui Huang, Beijing (CN); Honggang Li, Beijing (CN); Shantidev Mohanty, Santa Clara, CA (US)

(73) Assignee: INTEL CORPORATION, Santa Clara, CA (US)

( * ) Notice: Subject to any disclaimer, the term of this patent is extended or adjusted under 35 U.S.C. 154(b) by 26 days.

(21) Appl. No.: 13/977,004

(22) PCT Filed: Dec. 27, 2011

(86) PCT No.: PCT/US2011/067417
§ 371 (c)(1),
(2), (4) Date: May 29, 2014

(87) PCT Pub. No.: WO2013/039543
PCT Pub. Date: Mar. 21, 2013

(65) Prior Publication Data
US 2014/0274082 A1 Sep. 18, 2014

Related U.S. Application Data

(60) Provisional application No. 61/533,689, filed on Sep. 12, 2011.

(51) Int. Cl.
| | |
|---|---|
| H04W 4/00 | (2009.01) |
| H04W 28/20 | (2009.01) |
| H04W 76/02 | (2009.01) |
| H04W 52/02 | (2009.01) |
| H04W 4/06 | (2009.01) |

(Continued)

(52) U.S. Cl.
CPC .......... *H04W 4/005* (2013.01); *H04L 5/0037* (2013.01); *H04W 4/06* (2013.01); *H04W 28/20* (2013.01); *H04W 52/0216* (2013.01); *H04W 52/0219* (2013.01); *H04W 76/028* (2013.01); *H04W 76/048* (2013.01)

(58) Field of Classification Search
None
See application file for complete search history.

(56) References Cited

U.S. PATENT DOCUMENTS

| | | | |
|---|---|---|---|
| 6,980,561 B1 | 12/2005 | Abi-Nassif | |
| 7,274,708 B2* | 9/2007 | Benveniste | ......... H04L 12/4013 370/338 |
| 9,143,226 B2* | 9/2015 | Choi | ................... H04W 74/085 |

(Continued)

FOREIGN PATENT DOCUMENTS

WO 2007/103619 A2 9/2007

OTHER PUBLICATIONS

International Search Report and Written Opinion, Mailed Date: Sep. 27, 2012, Application No. PCT/US2011/067417, Filed Date: Dec. 27, 2011, pp. 11.

Draft (Sep. 10, 2011) IEEE, "IEEE 802.16 Broadband Wireless Access Working Group; Proposal for M2M initial backoff window scheme in 802.16m", IEEE C802.16p-11/0253, pages.

(Continued)

*Primary Examiner* — Diane Mizrahi

(57) ABSTRACT

An apparatus may include a processor circuit and an adaptive access module operable on the processor circuit to schedule broadcast of random access resources to access a radio network and to adaptively adjust an initial backoff window size for access signaling to the radio network during an access period. Other embodiments are disclosed and claimed.

19 Claims, 11 Drawing Sheets

(51) Int. Cl.
*H04W 76/04* (2009.01)
*H04L 5/00* (2006.01)

(56) References Cited

U.S. PATENT DOCUMENTS

| | | | | |
|---|---|---|---|---|
| 2002/0154653 | A1* | 10/2002 | Benveniste | H04L 12/4013 370/447 |
| 2006/0039281 | A1* | 2/2006 | Benveniste | H04L 12/4013 370/230 |
| 2006/0245447 | A1 | 11/2006 | Chou et al. | |
| 2007/0206547 | A1* | 9/2007 | Gong | H04L 45/122 370/338 |
| 2007/0232307 | A1* | 10/2007 | Ibrahim | H04W 36/30 455/436 |
| 2008/0304448 | A1* | 12/2008 | Hosein | H04W 72/08 370/329 |
| 2010/0091644 | A1 | 4/2010 | Chen | |
| 2012/0231828 | A1* | 9/2012 | Wang | H04W 74/04 455/509 |
| 2014/0098667 | A1* | 4/2014 | Choi | H04W 74/085 370/230 |
| 2014/0128051 | A1* | 5/2014 | Choi | H04W 74/085 455/418 |

OTHER PUBLICATIONS

Ksentini, A., et al. "Sliding contention window (SCW): toward backoff range-based service differentiation over IEEE 802.11 wireless LAN networks", IEEE Network, vol. 19, Issue 4, Jul.-Aug. 2005, pp. 45-51.
Office Action received for German Patent Application No. 112011105608.7, mailed Dec. 5, 2014, 21 pages including 9 pages English translation.
Office Action received for Korean Patent Application No. 2014-7008091, mailed Sep. 30, 2015, 9 pages including 5 pages English translation.
Huang et al., "Proposal for M2M initial backoff window scheme in 802.16m", IEEE 802.16 Broadband Wireless Access Working Group, (Sep. 10, 2011), 4 pages.
Nafaa et al, "Sliding Contention Window (SCW): Towards Backoff Range-Based Service Differentiation over IEEE 802.11 Wireless LAN Networks ", IEEE Network, Jul./Aug. 2005, 7 pages.
Cha, Jaesun, IEEE C802.16p-11/0126 "Evaluation Guideline for Comparison of Network Entry Solutions", produced by the 802.16 WG, M2M TG, Network Entry ad-hoc group, 6 pages.
IEEE 802.16p-11/0033; WirelessMAN-Advanced Air Interface for Broadband Wireless Access Systems; IEEE, Oct. 2011, 63 pages, (author unknown).

\* cited by examiner

SYSTEM AND METHOD FOR IMPROVING NETWORK ACCESS IN MACHINE TO MACHINE COMMUNICATION

RELATED APPLICATION

This application claims priority to U.S. provisional patent application No. 61/533,689 filed Sep. 12, 2011 and incorporated by reference herein in its entirety.

BACKGROUND

Machine to Machine (M2M) communications, also termed "machine type communications" (MTC), is emerging as a dynamic technology, which enables the "Internet of things" that can exchange information without human interaction. In some cases M2M communication entails wireless information exchange between a subscriber station (M2M device) and a server in the core network of an operator, with the aid of a base station in the radio access network of the operator. Another example involves the wireless exchange of information between two different subscriber stations linked to a base station. In each of these M2M communications, no human interaction need take place.

Various present day communications standards that were originally developed to facilitate human communications have recently been updated to set forth general features of architecture and procedures for M2M communications, including 802.16 and 3GPP LTE standards. In particular, the standard anticipates that a large number of M2M/MTC devices may be deployed in any specific area, requiring a network to support increased load as well as possible surges of M2M/MTC traffic. For example, according to the 802.16p standard requirement (IEEE 802.16p-10/0004, "802.16p System Requirements Document") a system shall support a large number of devices and mechanisms for low power consumption in M2M devices. This implies that within the range of each base station handling M2M communications, a large number of M2M devices are to be supported. In view of the above, it may be desirable to develop additional procedures for handling communications in networks in which multiple M2M devices are deployed.

It is with respect to these and other considerations that the present improvements have been needed.

DETAILED DESCRIPTION

Figure 1:
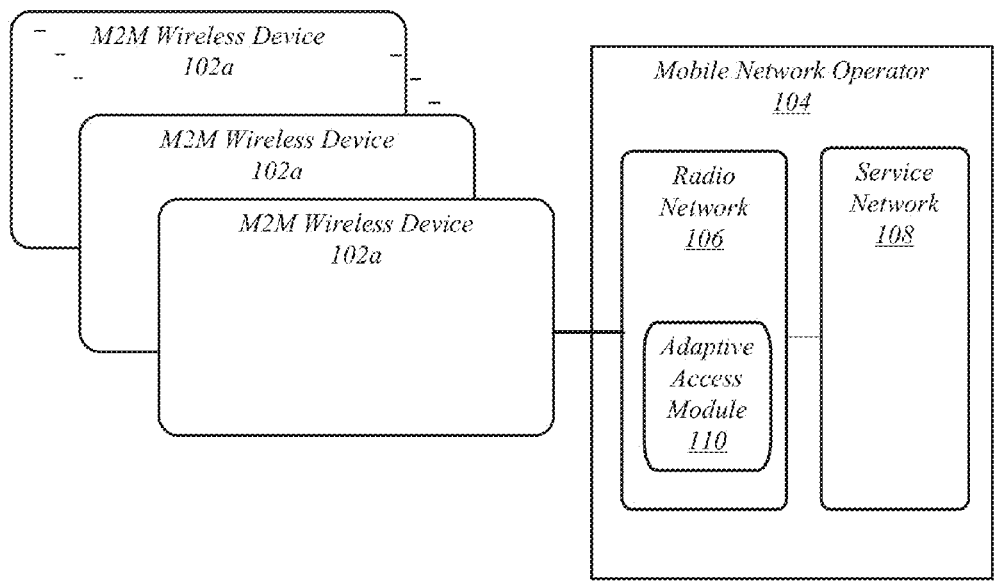
FIG. 1 depicts a system consistent with various embodiments.

Various embodiments are related to improving machine to machine (M2M) communications in a wireless network. Some embodiments of a communications system may be implemented with a radio technology such as the Institute of Electrical and Electronics Engineering (IEEE) 802.16 (Wi-MAX), IEEE 802-20, the 3rd Generation Partnership Project (3GPP) Evolved Universal Mobile Telecommunication System (UMTS) Terrestrial Radio Access (UTRA) (E-UTRA), among others. IEEE 802.16m is an evolution of IEEE 802.16e, and provides backward compatibility with an IEEE 802.16-based system. The UTRA is a part of UMTS. The 3GPP long term evolution (LTE) is a part of an evolved UMTS (E-UMTS) using the E-UTRA. LTE-advance (LTE-A) is an evolution of the 3GPP LTE. As used herein, any reference to the term "LTE" includes any version of LTE, including LTE-A and its revisions, progeny, and variants. The embodiments are not limited in this context.

The present embodiments may improve communications when multiple M2M devices are deployed within a radio network. With the actual and potential deployment of larger numbers of M2M devices in wireless networks, there is a potential for massive concurrent data and signaling transmission involving M2M/MTC devices, which may lead to radio access network congestion and/or signaling network congestion. This may lead to unacceptable delays, packet loss or even service unavailability.

Mechanisms to guarantee network availability and to aid in meeting performance requirements under such M2M/MTC load may therefore be desirable. For example, optimization of the random access procedure, such as applying different access priority to different M2M/MTC devices may be useful. Another possible solution involves random access rejection by the higher level core network (CN), which may lessen the network overload, but at the expense of a lower efficiency because of eventual collision that takes place in the physical air interface. However, in the current communication standards, solutions to potential problems resulting from higher collision probability caused M2M overloading have yet to be adequately addressed.

Recently, one proposal for incorporation into future standards involves the introduction of an extended initial backoff window size for access to a network (see, IEEE C802.16p-11/0126 "Evaluation Guideline for Comparison of Network Entry Solutions", produced by the 802.16 WG, M2M TG, Network Entry ad-hoc group). During attempts to communicate with a network, such as to perform ranging, a connecting device, such as an M2M device, may be accorded an initial backoff window, which comprises a wait time for retry of a transmission. Under given network loading conditions, when retries are attempted, the success rate for access, which may be termed the successful access ratio, increases as the backoff window increases, that is, as the wait time for retry increases. Accordingly, setting a larger backoff window may increase the successful access ratio for a given device.

However, merely extending the initial backoff window to a large size may engender other problems. For example, when loading is low, employing an excessively large backoff window may greatly degrade system performance, since accessing devices may have to wait much longer than necessary for successful access. Instead of employing the above approach, various embodiments disclosed herein present systems and methods to improve access to a network by dynamically adjusting an initial backoff window size.

FIG. 1 depicts a system 100 consistent with various embodiments. The system 100 includes multiple M2M wireless devices (or "M2M device") 102a (where "a" is any positive integer) that are serviced by a mobile network operator 104. The mobile network operator 104 may include a radio network 106 that may establish wireless communication with the M2M devices 102, as well as a service network 108. Data transmitted to and from the M2M devices 102 may be communicated to the service network 108, and may also be communicated with other M2M devices coupled to the mobile network operator.

As illustrated, a radio network 106 may include an adaptive access module 110, whose operations are detailed below. The adaptive access module 110 may be employed to improve network access among a group of devices, such as M2M devices 102a-102n. In particular, the adaptive access module 110 may act to optimize random access procedures to improve overall random access latency in a network of M2M devices. This may be especially effective under scenarios in which network service levels may vary in an unpredictable manner over time. In particular, the adaptive access module 110 may adaptively update various communications parameters with a certain interval, such as backoff parameters to be employed by the M2M devices 102a during network access signaling, among other communications parameters.

In particular, the random access load from M2M devices 102a in communication with radio network 106 may be calculated by a base station (not shown) of the radio network 106 and may be used to trigger reallocation of random access resources when the random access load reaches a certain level. The reallocation of random access resources, such as a backoff window may then be used by the M2M devices 102a to update their network access behavior, resulting in a more efficient access process.

Figure 2A:
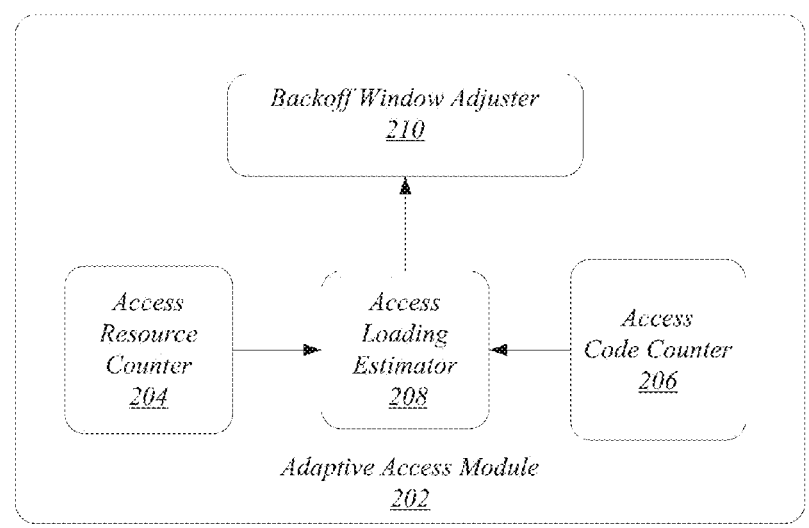
FIG. 2a depicts details of an adaptive access module arranged in accordance with various embodiments.

FIG. 2a depicts details of an adaptive access module arranged in accordance with various embodiments. The adaptive access module 202 may be an exemplary implementation of the adaptive access module 110 as described with reference to FIG. 1. The adaptive access module 202 may act to adjust a backoff window to be used by terminals including M2M devices 102a for accessing a network, such as the radio network 106. In particular, the backoff window may be increased when access loading increases and decreased when access loading decreases. In principle, the access collision probability for an M2M device or mobile station (MS) is highly related to the number of access devices within a distributed duration. This implies that under scenarios in which there are a relatively large number of M2M devices 102a that attempt to access the radio network 106, a larger initial backoff window is desirable or needed in order to reduce the collision probability of different communications that are conducted between a base station of radio network 106 and two or more M2M devices 102a. The adaptive access module 202 may include an access resource counter 204 to count the total number of available ranging channels in an access window, a used access channel counter 206 to count the total number of available ranging channels being used in an access window, and an access loading estimator 208 to perform access loading estimation based on the number of ranging channels available and being used. This information may be employed by a backoff window adjuster 210 to adjust the initial backoff window size to be sent to M2M devices 102a for ranging or related operations, as detailed below.

Figure 2B:
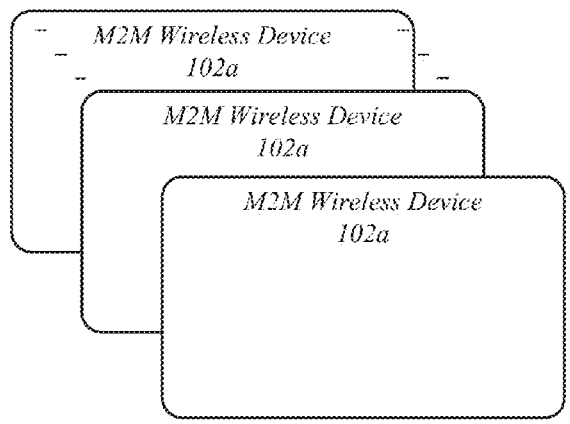
FIG. 2b depicts one scenario for backoff window size adjustment consistent with the present embodiments.
Figure 2B:
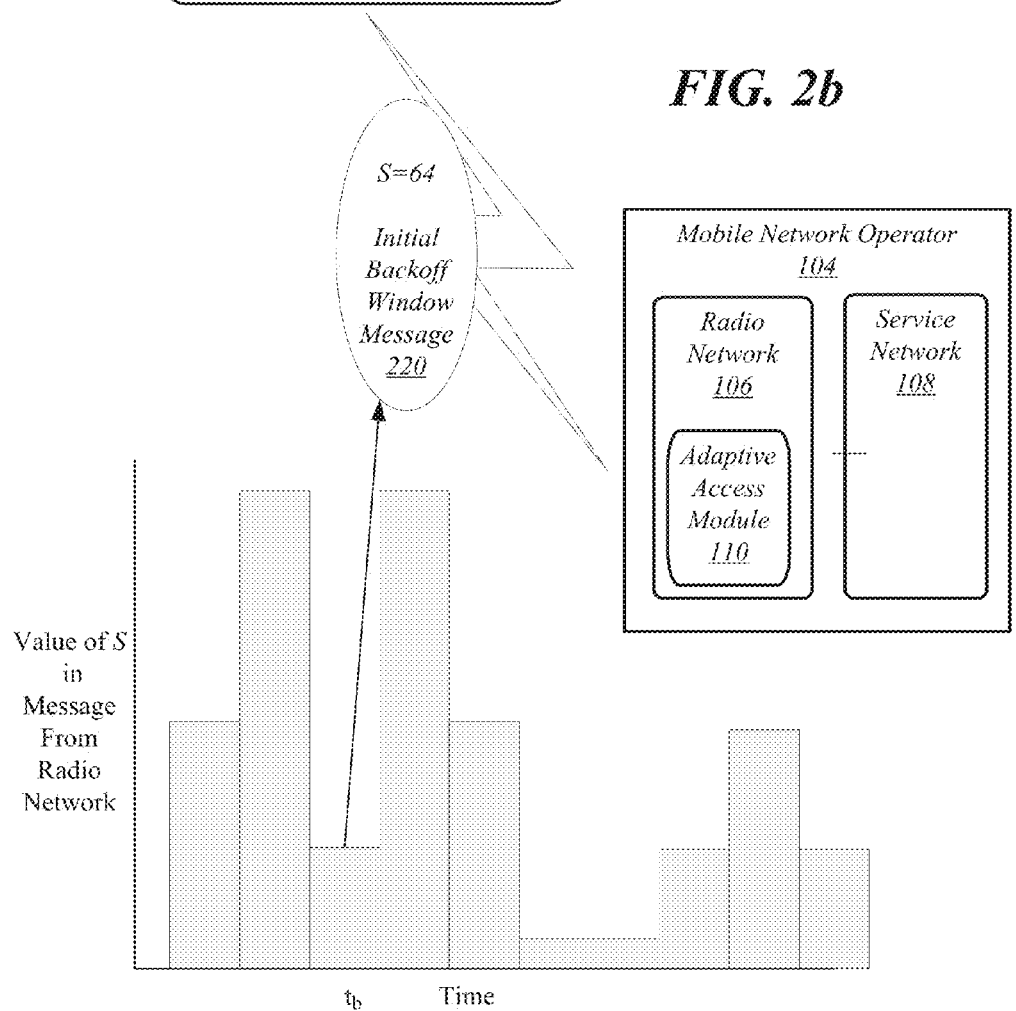

FIG. 2b depicts a scenario of adjustment of the initial backoff window size S in which the adaptive access module 202 may adjust S on a continuing basis. The example of variation of the initial backoff window size S over time illustrated in FIG. 2b depicts a case in which successive values of S set by the adaptive access module 202 may vary substantially; however, in other examples the value of S may vary in a more gradual manner. As illustrated in FIG. 2b, the value of S may be sent in an initial backoff window message 220 that may be transmitted for use by those M2M devices 102a that are accessing the Mobile operator network 104 at a given time. In the specific example illustrated, at the instance $t_b$ the value of S sent to M2M devices 102a in the initial backoff window message 220 is 64. In a subsequent instance, the value of S sent to M2M devices 102a in the initial backoff window message 220 may be 256, and so forth, as illustrated in FIG. 2b.

Figure 3:
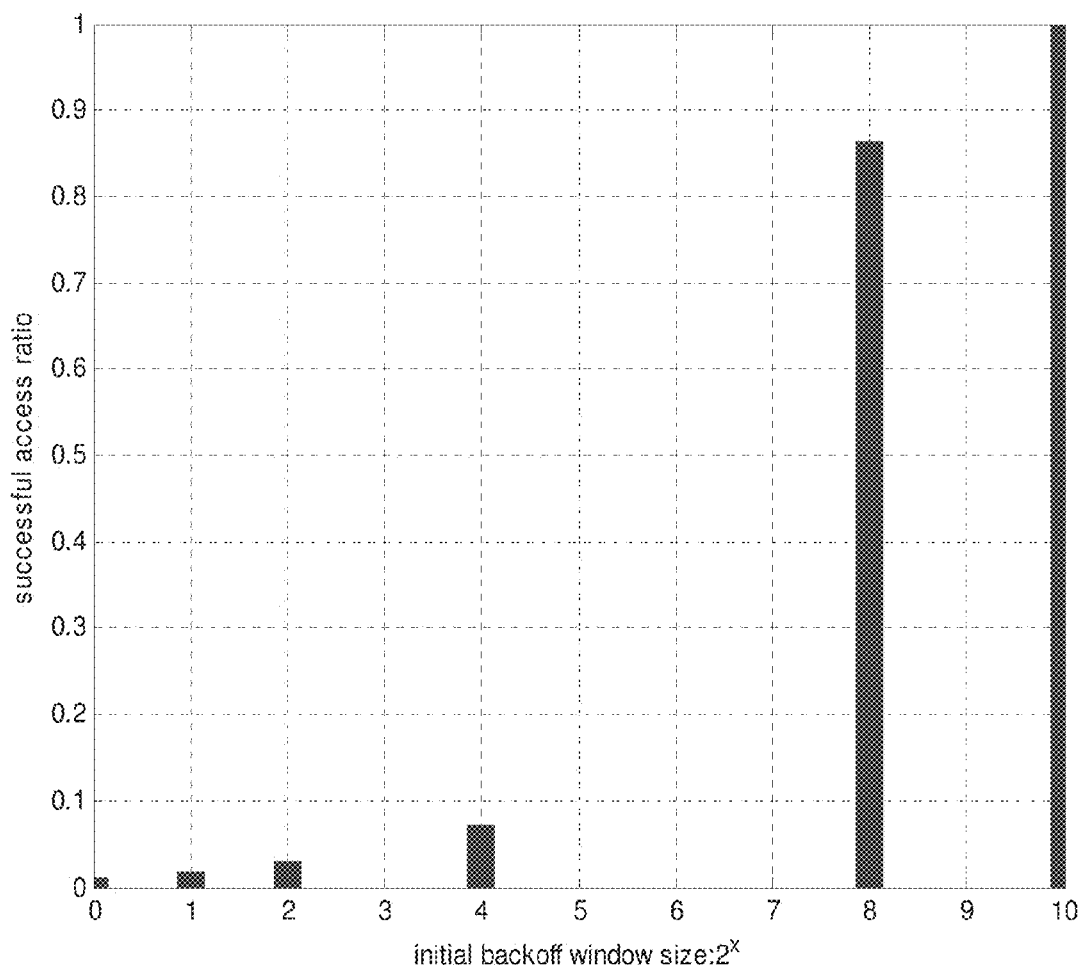
FIG. 3 depicts the effect of varying backoff window size on the successful access ratio.

In various embodiments, the adaptive access module 202 may determine the proper size of S according to various considerations. One such consideration is the desired or acceptable success rate for devices accessing the radio access network 106. FIG. 3 depicts the effect of varying the backoff window size on the successful access ratio, which denotes the fraction of access attempts of a device that are successful. Unsuccessful access attempts may be caused, for example, by collisions that may occur when access loading is high enough that multiple communications between a base station and respective multiple M2M devices may occur in close proximity.

The results in FIG. 3 are shown for different initial backoff window sizes given a constant access loading condition. As shown in FIG. 3, for relatively smaller access window sizes, such as S=1 up to S=16 ($2^4$), the successful access ratio is quite low, less than 10%. The successful access ratio increases rapidly when the size of the initial backoff window is raised from 16 to 256 ($2^8$), where the successful access ratio is greater than 85%. Thus, for the given access loading in the example of FIG. 3, a high degree of access success can be assured by setting the backoff window size at a value of 256 or larger.

In view of the results of FIG. 3, if a base station can accurately determine the level of access loading giving rise to the access ratio behavior of FIG. 3, the base station (BS) can schedule the appropriate size for a backoff window to ensure a desired access success ratio. However, at a given time, a BS may not know in general the exact number of accessing M2M devices from which to determine the access loading, because some of the M2M devices may transmit the same ranging code. Therefore, without knowledge of current access loading, it may be difficult for the base station to specify the appropriate initial backoff window to be used by the M2M devices.

To take advantage of the correlation between initial backoff window size and access success ratio for a given access loading shown in FIG. 3, the present embodiments provide novel procedures to estimate access loading, and thereby facilitate adjustment of the initial backoff window to be used by M2M devices 102a. For example, a base station of radio network 106 may employ the adaptive access module 202 to generate an access loading estimation, which may represent the percentage usage of ranging channels by M2M devices 102a. In particular, the ranging channel usage percentage can be defined as an access loading estimation metric λ as follows:

$$\lambda(t) = \alpha * \frac{M(t)}{N(t)} \quad (1)$$

where M(t) is the total number of ranging channels being used in an access window t, where N(t) is the total number of available ranging channels in an access window t, where α is a weight coefficient that is related to some other long term access statistics aspects, for example, the capability of successful preamble detection. In one example, M(t) may be determined by the access resource counter 204, while N(t) is determined by the access code counter 206, which results may be fed to the access loading estimator 208 to determine λ(t).

In addition to the access loading estimation metric λ(t), an average access loading estimation metric $\lambda_{avg}$ can be expressed as:

$$\lambda_{avg} = \text{mean}(\lambda(t)) \ t \in [t_0+1, \ldots, t_0+T] \quad (2).$$

Figure 4:
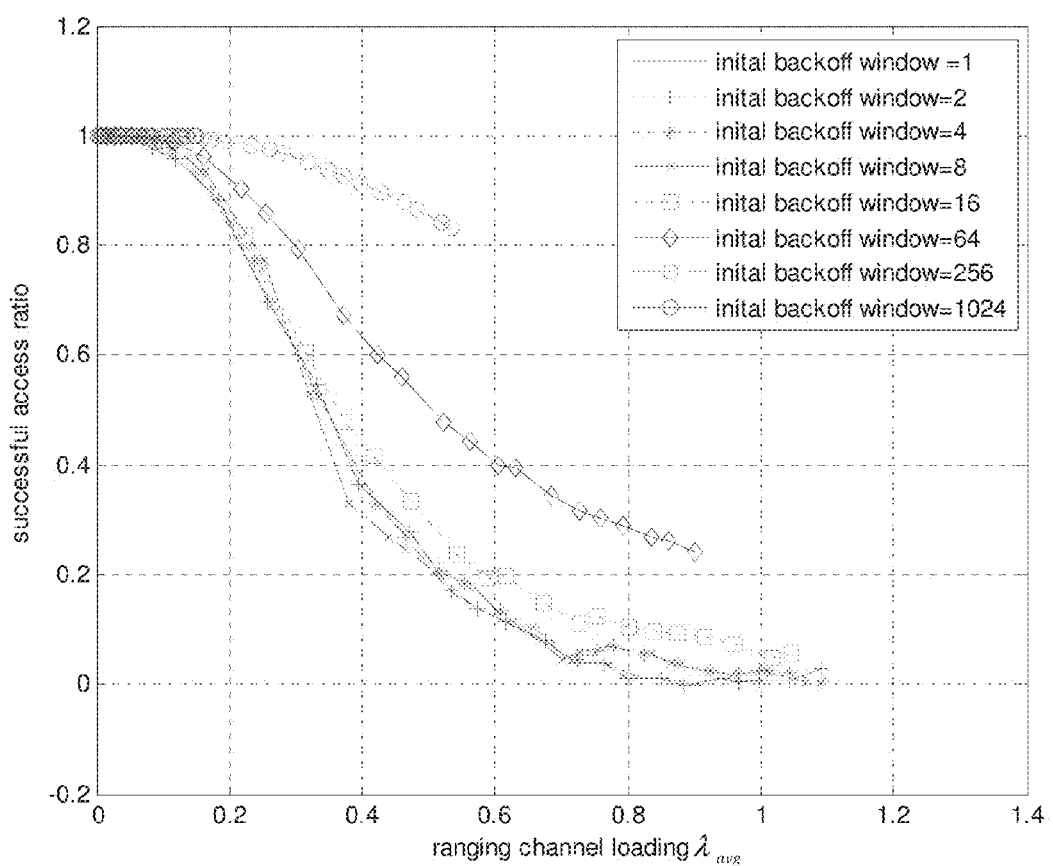
FIG. 4 depicts results of calculation of successful access ratio as a function of average access loading estimation $\lambda_{avg}$ for a series of different backoff window sizes.

To aid in proper selection of an initial backoff window size, the backoff window adjuster may employ simulation to track the effect of backoff window size on the successful access ratio for different access loading conditions. FIG. 4 depicts results of calculation of successful access ratio as a function of $\lambda_{avg}$ (also termed "ranging channel loading" in the FIGs.) for a series of different backoff window sizes. In particular eight different curves are illustrated for eight different backoff window sizes ranging from S=1 up to S=1024. The curves are plotted over a range of $\lambda_{avg}$ that extends up to about 1.1 in some cases. As shown in FIG. 4, for low access loading conditions where $\lambda_{avg}$ is below about 0.1, the successful access ratio is close to 1 (%100) and is insensitive to backoff window size. In other words, when the access loading conditions are sufficiently low, increasing the size of a backoff window is not necessary, since even at low values of backoff window, the successful access ratio is very high. Accordingly, when a network, such as radio network 106, is operating under such low access loading conditions, it may be desirable to minimize the size of the initial backoff window for M2M devices accessing the radio network 106.

On the other hand, as the value of $\lambda_{avg}$ increases, particularly above about 0.1-0.2, there are two pronounced effects. The first effect is that the successful access ratio decreases at all backoff window sizes. The second effect is that for a given value of $\lambda_{avg}$ the decrease in successful access ratio is more pronounced as the backoff window size decreases. This is particularly apparent for backoff window sizes in the range of S=16 to S=256. For initial backoff window size in the range of 1-8 the behavior of successful access ratio as a function of $\lambda_{avg}$ shows a marked decrease between $\lambda_{avg}$ values of about 0.2 and 0.5, such that at values of $\lambda_{avg}$ that lie above 0.5 the probability of a successful access is less than 0.2. Nor does the successful access ratio behavior change substantially with backoff window size for a range between S=1 and S=8. At values of S=16 or greater, the decrease in successful access ratio with $\lambda_{avg}$ becomes less rapid. For example, at a $\lambda_{avg}$ value of 0.5, the successful access ratio is still about 0.5, as compared to the aforementioned values of less than 0.2 when S is less than or equal to 8. Moreover, when the backoff window is increased to S=256, the successful access ratio increases to about 0.85 at a $\lambda_{avg}$ value of 0.5. Accordingly, it is evident that under relatively higher access loading conditions, such as when $\lambda_{avg}$ has a value above about 0.2, the successful access ratio is sensitive to the initial backoff window size.

In view of the above results, in accordance with the present embodiments, a base station may employ multiple operations to estimate access loading conditions, and to adjust initial backoff window size based upon a desired level of operations, such as a desired successful access ratio for mobile devices, such as M2M devices.

Figure 5:
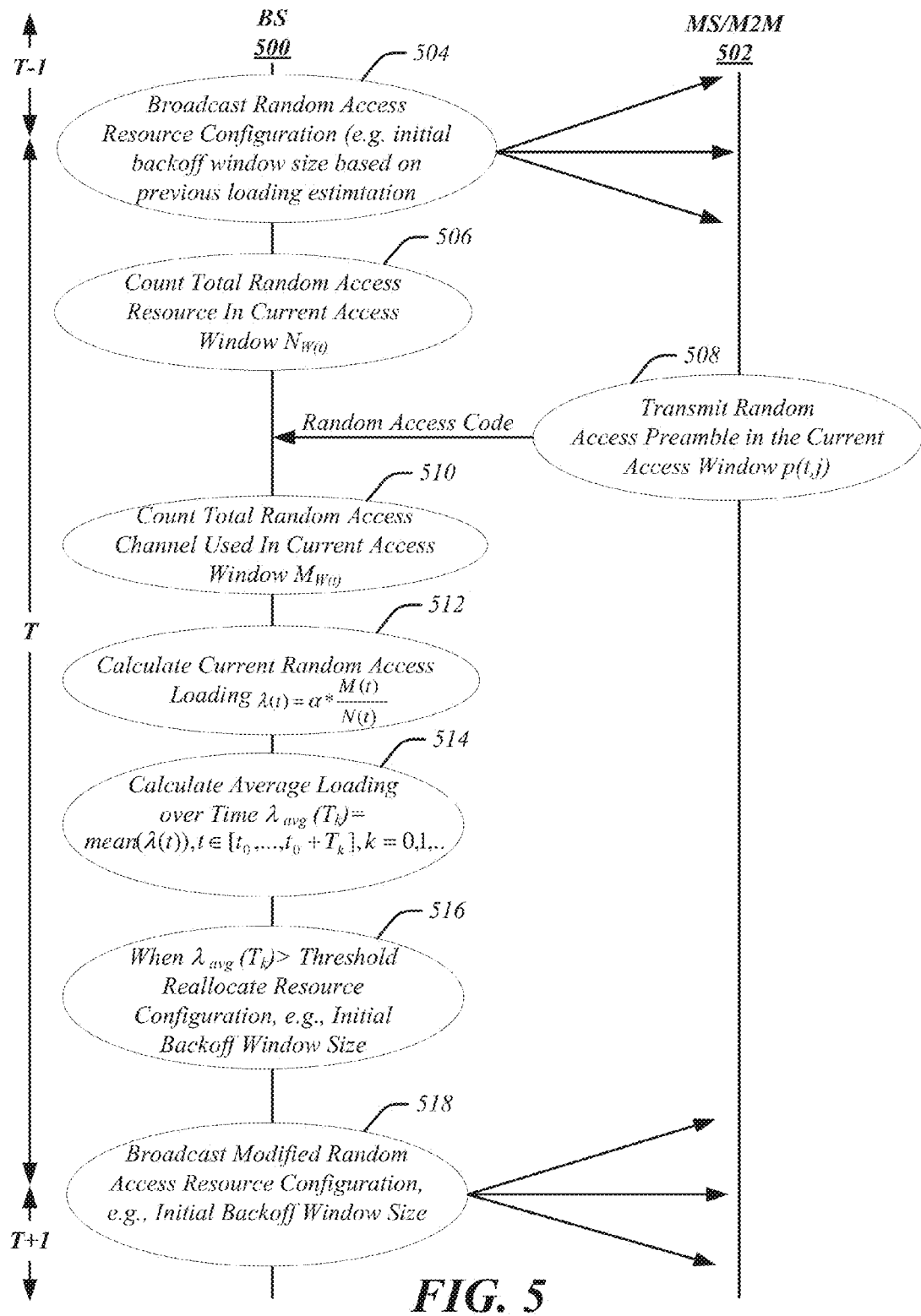
FIG. 5 depicts exemplary operations for dynamically adjusting random access resources consistent with the present embodiments.

FIG. 5 depicts exemplary operations for dynamically adjusting random access resources consistent with the present embodiments. In particular, various operations are shown that may be performed by a base station 500 and mobile station (MS)/M2M device 502 coupled to the base station 500 through a wireless connection. The operations are shown as a function of time for a series of access periods, T−1 to T+1. In a first operation 504, the base station may broadcast a random access resource configuration to MS/M2M devices within broadcast range. The random access resource configuration may include, for example, the random access code set and the initial backoff window size based upon measurements and calculations performed in an immediately preceding access period T−1. For example, a backoff window size may be broadcast to MS/M2M 502 based upon a previous access loading estimation calculated from measurements in the previous access period T−1.

Subsequently, as illustrated by operation 506, the base station may count total random access resources $N_{W(t)}$ for the current access window. As represented by operation 508, an MS/M2M device 502 may generate a random access preamble code, which may be transmitted to the base station 500 over an available random access channel. Consistent with the present embodiments, the operation 508 may be repeated by multiple MS/M2M devices. In a subsequent operation 510, the base station 500 may count the total random access channels that are being used $M_{W(t)}$ in the current access window by either mobile stations or M2M devices, which may be based at least in part upon all the channels that transmit the random access preamble code in operation 508.

In the operation 512, the base station 500 may then calculate the current random access loading $\lambda(t) = \alpha M_{W(t)} / N_{W(t)}$, where α represents a weight coefficient related to other aspects of long term access statistics.

In the operation 514, the base station 500 may calculate an average random access loading estimation, $$\lambda(t) = \alpha * \frac{M(t)}{N(t)}.$$

In particular, the base station 500 may collect the access loading estimation during the intervals $T_k$ in order to obtain the average access loading over a time period T. The calculation of $\lambda_{avg}$ may result from performing a series of different calculations of λ(t) at different instances over time T, and averaging the calculations of λ(t).

In one embodiment, the calculation of $\lambda_{avg}$ may proceed according to $$\lambda_{avg}(T_k) = \text{mean}(\lambda(t)), \ t \in [t_0, \ldots, t_0+T_k], \ k=0,1,\ldots, \quad (3).$$

During the calculating of average random access loading, when if $\lambda_{avg}(T_k)$ exceeds a threshold $Th_1$, the base station 500 may reallocate resource configurations, such as the initial backoff window size, as specified in operation 516. In this manner, the initial backoff window size may be changed dynamically to adjust for changes in the calculated value of $\lambda_{avg}$ ($T_k$) when such changes are sufficient to warrant adjustment in the initial backoff window size.

At the end of the current access period T, in operation 518, the base station 500 may broadcast a new random access resource configuration, which may include a new initial backoff window size based upon the calculated $\lambda_{avg}$ ($T_k$) in the access period T. The new initial backoff window may then be used by MS/M2M device 502 in the immediately following access period T+1.

In various embodiments, the calculation of $\lambda_{avg}$ ($T_k$) may be used in conjunction with other parameters to adjust the random access parameters for subsequent access windows. For example, when the $\lambda_{avg}$ ($T_k$) is measured for a current access window, a base station, such as base station 500, may determine whether any random access parameters are to be adjusted for a subsequent access window based upon the value of $\lambda_{avg}$ ($T_k$) and based upon other parameters. The base station 500 may take into account such factors as the current initial backoff window size, the target successful access ratio $r_{target}$, for devices accessing the network of base station 500, such as M2M devices.

Figure 6:
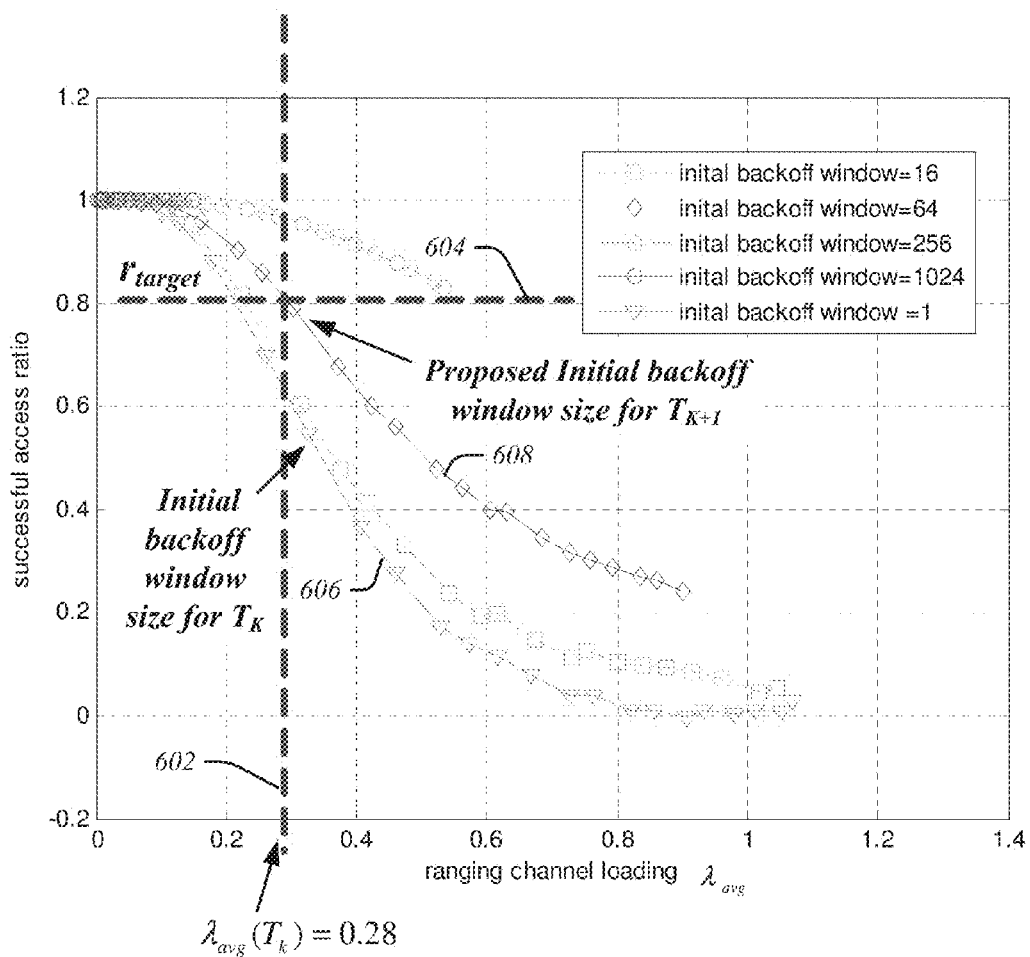
FIG. 6 presents depicts results of calculation of successful access ratio as a function of $\lambda_{avg}$ for different backoff window sizes.

FIG. 6 presents results of calculation of successful access ratio as a function of $\lambda_{avg}$ for different backoff window sizes that may be used to illustrate adjusting of random access parameters according to various embodiments. As an example, the base station 500 may adjust random access parameters to be applied in an immediately following period $T_{k+1}$ based on the $\lambda_{avg}$ ($T_k$) determined for a first period and based on an expected successful access ratio $r_{target}$($T_{k+1}$). In FIG. 6, there are shown results of calculation of successful access ratio as a function of $\lambda_{avg}$ for a series of five different backoff window sizes, which are excerpted from the results presented in FIG. 4. In particular, curves representing backoff window sizes of S=1, S=16, S=64, S=256, and S=1024 are illustrated.

In accordance with the present embodiments, an initial backoff window for a new period $T_{k+1}$ may be selected based upon comparison of the backoff window curves to information related to the parameters $\lambda_{avg}$ ($T_k$) and $r_{target}$($T_{k+1}$). In one embodiment, as detailed below, backoff window curves may be compared to identify a curve that lies near an intersection of representing $\lambda_{avg}$ ($T_k$) and $r_{target}$($T_{k+1}$) as described below.

To illustrate operation of the present embodiments, it may be assumed that over an access window $T_k$ an initial backoff window of S=1 is employed and that a value of the average random access loading estimate $\lambda_{avg}$ ($T_k$) is determined to be 0.28. By employing a short initial backoff window of S=1, wireless devices, such as M2M/MS 502, may rapidly retransmit for access to the network of the base station 500. However, a tradeoff of such low wait time for retransmitting may be a lower probability of access for a given device, that is, a lower successful access ratio r. The vertical dashed line 602 in FIG. 6 represents the determined value of $\lambda_{avg}$ ($T_k$), the average random access loading estimate during the period $T_k$. It can be seen that curve 606, representing the successful access ratio behavior for initial backoff window size S=1, intersects the vertical dashed line 602 at a value of successful access ratio r that equals about 0.6. This indicates that if an initial backoff window size of S=1 continues to be used under the conditions determined for the current period $T_k$, that is, when $\lambda_{avg}$ ($T_k$) is 0.28, a resulting successful access ratio of about 0.6 can be expected for M2M devices performing ranging operations, for example.

In view of the above, the base station 500 may determine that adjustment of random access parameters are in order. For example, a target for successful access ratio $r_{target}$ may be set at 0.8 for an immediately following period $T_{k+1}$, as illustrated by dashed line 604. This target ratio may be pre-existing, that is, it may be a current target for the period $T_k$, or it may be a new value that represents a change from a current value. In either case, the base station 500 may determine that $r_{target}$ for the access period $T_{k+1}$ is to be set at 0.8.

After the base station 500 determines that the current backoff window of S=1 yields a successful access ratio of about 0.6 given the just-determined value of $\lambda_{avg}$ ($T_k$) of 0.28, the base station 500 may determine that the backoff window size is to be increased from the current value of S=1 so as to yield a successful access ratio closer to the $r_{target}$ of value of 0.8. Accordingly, as further illustrated in FIG. 6, the base station may select the initial backoff window size S=64, whose behavior is illustrated by curve 608. As shown, the curve 608 closely approaches the intersection of the dashed line 602, representing the current average access loading estimation $\lambda_{avg}$ ($T_k$), and the dashed line 604, representing the value of $r_{target}$ of 0.8. Thus, if it is assumed that the average access loading in the immediately following period will be similar to the average access loading estimation determined in the current access period $\lambda_{avg}$ ($T_k$), an initial backoff window set at S=64 can be expected to yield close to $r_{target}$ of 0.8.

Turning once more to FIG. 5, after the initial backoff window is changed, in a subsequent operation 518, the base station 500 may broadcast the new (modified) random access parameters to be used in the period $T_{k+1}$, which may include the newly determined initial backoff window size.

Figure 7:
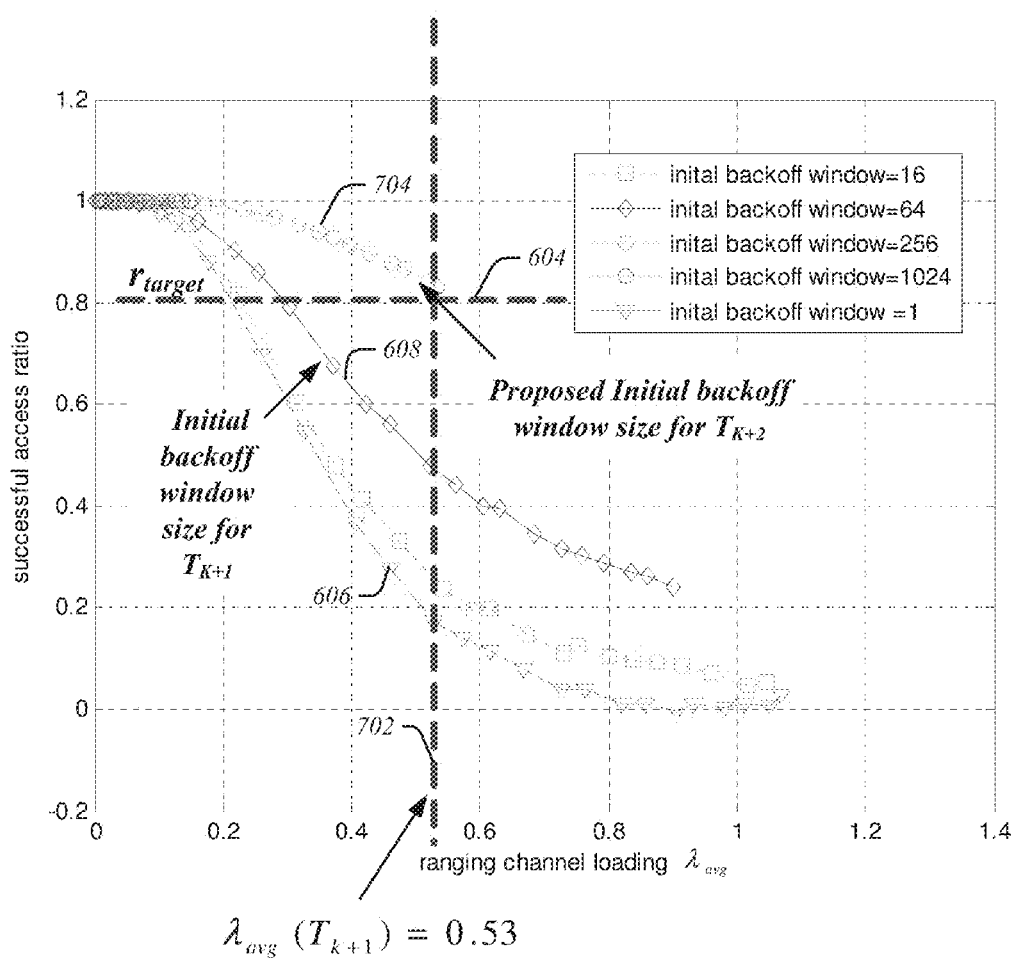
FIG. 7 presents depicts another example of adjusting random access parameters consistent with the present embodiments.

FIG. 7 presents another example of adjusting random access parameters consistent with the present embodiments. As with FIG. 6 the curves in FIG. 7 show the results of calculation of successful access ratio as a function of $\lambda_{avg}$ for a series of five different backoff window sizes, which are excerpted from the results presented in FIG. 4. In particular, curves representing backoff window sizes of S=1, S=16, S=64, S=256, and S=1024 are illustrated.

For clarity, the example of FIG. 7 presents an extension of the scenario illustrated in FIG. 6. Accordingly, the value of the initial backoff window during the access period $T_{k+1}$ illustrated is set at S=64. The successful access ratio behavior for S=64 again is illustrated by curve 608. However, in the example shown, the random access loading has shifted from what was predicted according to the average random access loading estimate $\lambda_{avg}$ ($T_k$) derived during period $T_k$. The results of a new set of operations performed according to the operations 504-516 for the access period $T_{k+1}$ produce a new average random access loading estimate $\lambda_{avg}$ ($T_{k+1}$) that equals 0.53, as shown. Thus, in the recent period, the access traffic from M2M/MS devices 502 has substantially increased since the time when average random access loading was previously estimated.

The new value of average random access loading estimate $\lambda_{avg}$ ($T_{k+1}$) is illustrated as the vertical dashed line 702 in FIG. 7. It can be seen that given the new value of average random access loading estimate $\lambda_{avg}$ ($T_{k+1}$) the successful access ratio r can be expected to be substantially less than in the scenario of FIG. 6 where the value of average random access loading estimate $\lambda_{avg}$ ($T_k$) was 0.28. Because of the shift in access loading, it can be seen that curve 608, representing the successful access ratio behavior for initial backoff window size S=64, intersects the vertical dashed line 702 at a value of ratio r that equals about 0.46. This indicates that the continued use of an initial backoff window size of S=64 under the conditions determined for the most recent period $T_{k+1}$, that is, when $\lambda_{avg}$ ($T_k$) is 0.53, can be expected to yield a successful access ratio of about 0.46.

In view of the above, the base station 500 may again determine that adjustment of random access parameters are in order. For example, a target for successful access ratio $r_{target}$ for the immediately following access period $T_{k+2}$ may be set or (maintained) at 0.8, as illustrated by dashed line 604.

After the base station 500 determines that the current initial backoff window of S=64 yields a successful access ratio of about 0.46 given the just-determined value of $\lambda_{avg}$ ($T_{k+1}$) of 0.53, the base station 500 may determine that the initial backoff window is to be increased so as to yield a successful access ratio closer to the value of $r_{target}$ of 0.8. Accordingly, as further illustrated in FIG. 7, the base station 500 may select the initial backoff window size S=256, whose behavior is illustrated by curve 704. As shown, the curve 708 closely approaches the intersection of the dashed line 702, representing the current average access loading estimation $\lambda_{avg}$ ($T_{k+1}$), and the dashed line 604, representing the value of $r_{target}$ of 0.8. Thus, if it is assumed that the average access loading in the immediately following period $T_{k+2}$, is to be similar to the average access loading estimation determined in the current period $\lambda_{avg}$ ($T_{k+1}$), an initial backoff window set at S=256 can be expected to yield close to the value of $r_{target}$ of 0.8.

Turning again to FIG. 5, after the initial backoff window is changed, in a subsequent operation 518, the base station 500 may broadcast the new (modified) random access parameters to be used in the access period $T_{k+2}$, which may include the newly determined initial backoff window size of S=256.

In the above manner, parameters including the initial backoff window size may be dynamically adjusted to account for changing radio environment in which the access loading may be subject to unpredictable change, which may cause unwanted changes in the ability of M2M devices to access a network.

In accordance with the present embodiments, the standards for managing ranging in M2M devices may be revised. In one example, the IEEE 802.16p amendment working document AWD (IEEE 802.16p-11/0033; WirelessMAN-Advanced Air Interface for Broadband Wireless Access Systems; IEEE, October, 2011) (hereinafter WiMAX M2M standard) may be updated to reflect procedures consistent with the present embodiments. In particular section 6.2.3 of the WiMAX M2M standard may be revised (new additions shown in bold) to include the following subject matter.

6.2.3.23 AAI-PAG-ADV (Paging Advertisement) Message

TABLE 706

AAI-PAG-ADV message field description

| Field | Size (bits) | Value/Description | Condition |
|---|---|---|---|
| . . . | | . . . | |
| . . . . | | | |
| If action Code== 0b00 ) { . . . | | | |
| Initial ranging backoff | 4 | Indicate the initial backoff window size for M2M devices | The initial backoff window given by BS according to: 1. Ranging loading |

TABLE 706-continued

AAI-PAG-ADV message field description

| Field | Size (bits) | Value/Description | Condition |
|---|---|---|---|
| start | | included in this group | estimation; or 2. Paging type: M2M group paging enabled |
| } } . . . | | . . . | |

As evident from Table 706, of which only a portion is excerpted above, a paging advertisement message may include a message field comprising an initial ranging backoff start field. The initial ranging backoff start field may carry an initial backoff window value, which is a 4-bit value that represents an initial backoff window size for M2M devices included in a given group. The initial backoff window value is dynamically determined based on ranging load estimation, as described by the various embodiments herein, and is broadcasted from a base station to a group of M2M devices. In one embodiment, the initial backoff window value dynamically determined by a ranging load estimation is only applied to a group of ranging M2M devices, and not all devices within communication range of a base station. In one embodiment, the initial backoff window value dynamically determined by a ranging load estimation is applied to all ranging devices within communication range of a base station, the ranging devices comprising M2M devices and non-M2M devices. The embodiments are not limited in this context.

In accordance with various embodiments, certain categories of operations may be exempted from the assignment of an initial backoff window according to the procedures outlined hereinabove. For example, M2M services, such as security notification may be accorded fast access regardless of the initial backoff window broadcast by a base station.

Included herein is a set of flow charts representative of exemplary methodologies for performing novel aspects of the disclosed system and architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 8:
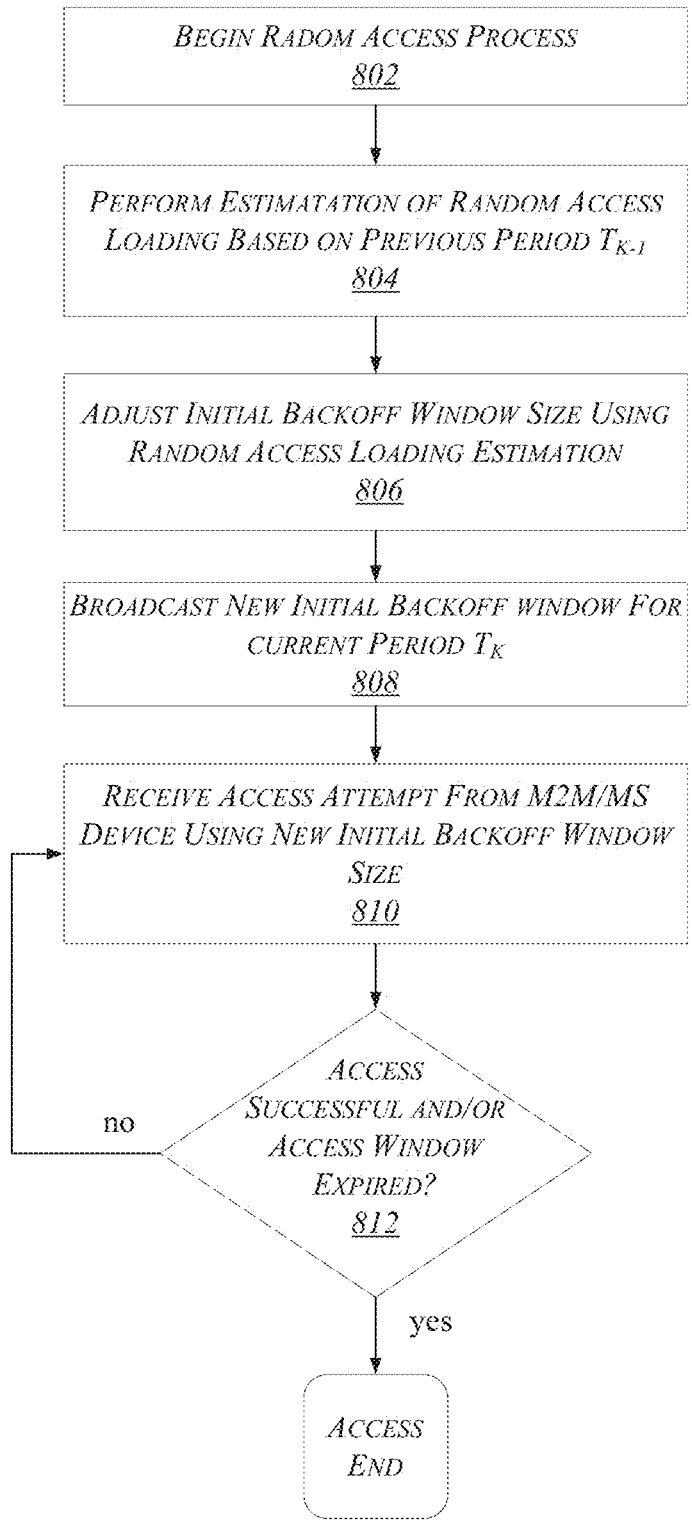
FIG. 8 depicts an exemplary logic flow.

FIG. 8 depicts an exemplary logic flow 800. At block 802, a random access process may begin. At block 804, an estimation operation is performed of random access loading based upon information collected from a previous period $T_{K-1}$. At block 806, an initial backoff window size is adjusted using the random access loading estimation performed based on the information collected from a previous access $T_{K-1}$.

At block 808, the new initial backoff window size is broadcast for the current period $T_K$ to be received by M2M/MS devices within a broadcast range.

At block 810, an access attempt is received by an M2M/MS device using the new initial backoff window for the current period $T_K$.

At block 812, if successful access occurs or an access window has expired, the flow moves to block 814, where the flow ends. If at block 812, successful access does not occur and the access window has not expired, the flow returns to block 810.

Figure 9:
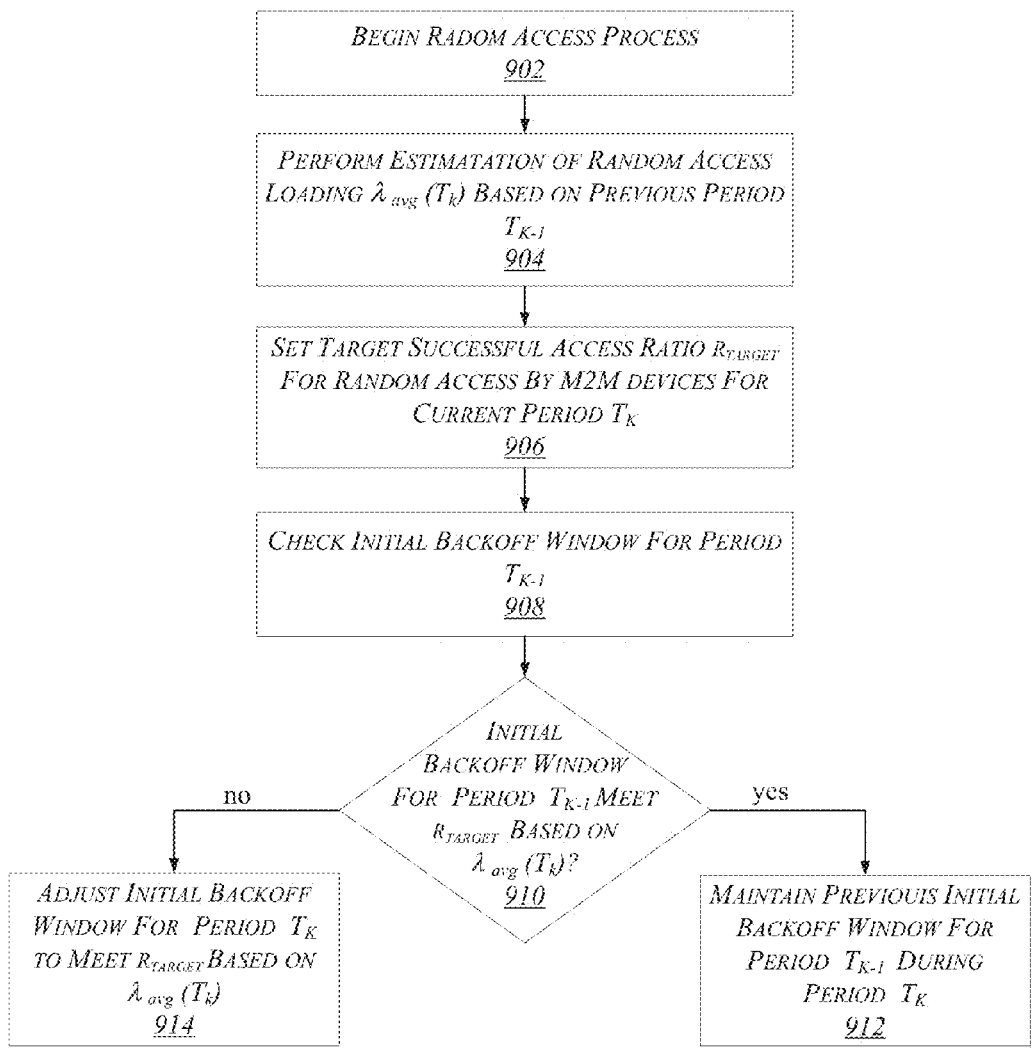
FIG. 9 depicts a logic flow consistent with additional embodiments.

FIG. 9 depicts an exemplary logic flow 900. At block 902, a random access process is started. At block 904, an estimation of average random access loading $\lambda_{avg}$ ($T_k$) is performed based upon measurements from a previous period $T_{K-1}$. At block 906, a target successful access ratio $r_{target}$ is set for random access by M2M devices in a current period $T_K$. At block 908, the initial backoff window size is checked for the current period $T_K$. At block 910, a determination is made as to whether the initial backoff window set for the period $T_{K-1}$ meets the set value of $r_{target}$ based on the $\lambda_{avg}$ ($T_k$). If so, the flow moves to block 912. At block 912, the initial backoff window for the period $T_{K-1}$ is maintained during the period $T_K$. If the value of $r_{target}$ is not met, the flow moves to block 914. At block 914, the initial backoff window for period $T_K$ is adjusted to meet $r_{target}$.

Figure 10:
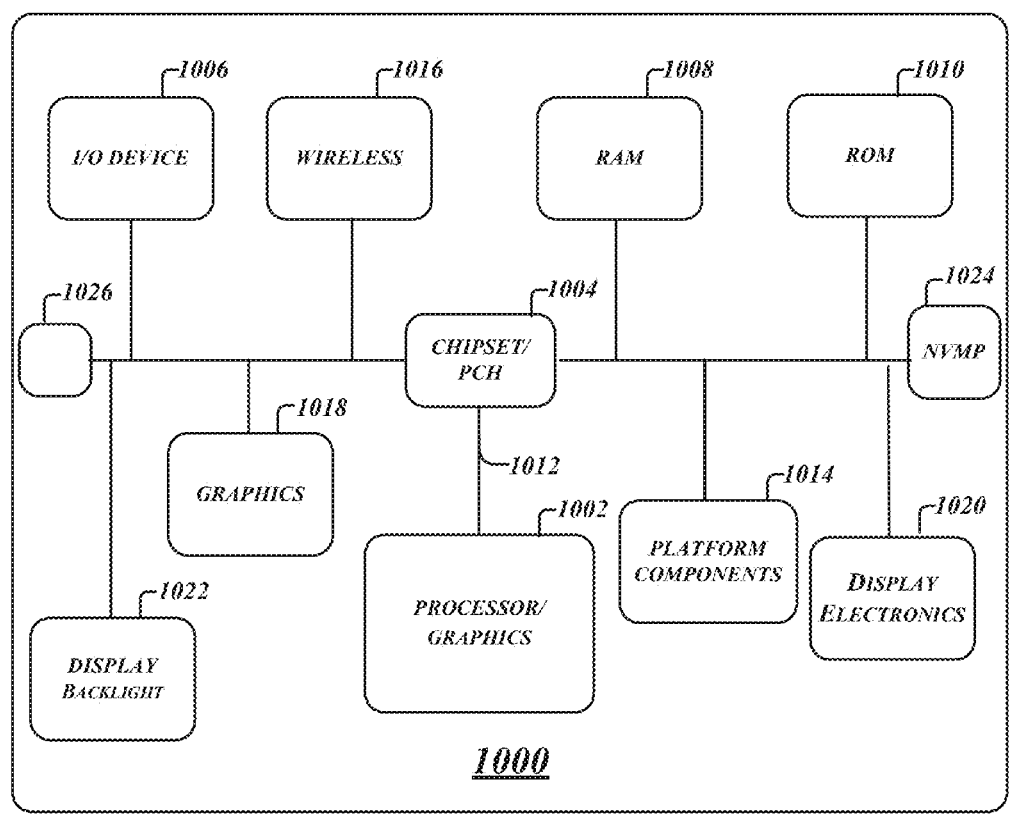
FIG. 10 is a diagram of an exemplary system embodiment.

FIG. 10 is a diagram of an exemplary system embodiment and in particular, FIG. 10 is a diagram showing a platform 1000, which may include various elements. For instance, FIG. 10 shows that platform (system) 1010 may include a processor/graphics core 1002, a chipset/platform control hub (PCH) 1004, an input/output (I/O) device 1006, a random access memory (RAM) (such as dynamic RAM (DRAM)) 1008, and a read only memory (ROM) 1010, display electronics 1020, display backlight 1022, and various other platform components 1014 (e.g., a fan, a crossflow blower, a heat sink, DTM system, cooling system, housing, vents, and so forth). System 1000 may also include wireless communications chip 1016 and graphics device 1018. The embodiments, however, are not limited to these elements.

As shown in FIG. 10, I/O device 1006, RAM 1008, and ROM 1010 are coupled to processor 1002 by way of chipset 1004. Chipset 1004 may be coupled to processor 1002 by a bus 1012. Accordingly, bus 1012 may include multiple lines.

Processor 1002 may be a central processing unit comprising one or more processor cores and may include any number of processors having any number of processor cores. The processor 1002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 1002 may be multiple separate processors located on separate integrated circuit chips. In some embodiments processor 1002 may be a processor having integrated graphics, while in other embodiments processor 1002 may be a graphics core or cores.

Figure 11:
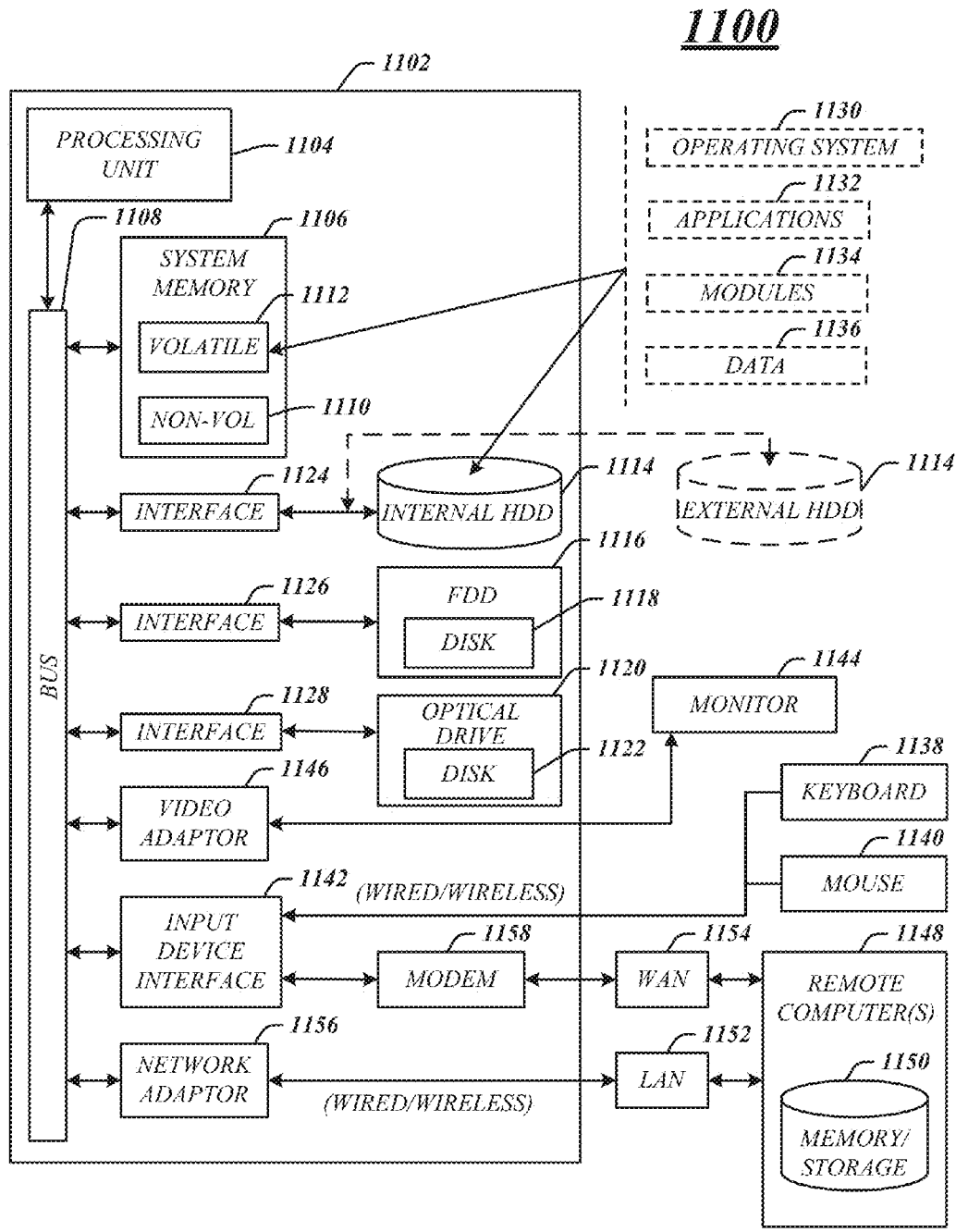
FIG. 11 illustrates an embodiment of an exemplary computing architecture.

FIG. 11 illustrates an embodiment of an exemplary computing system (architecture) 1100 suitable for implementing various embodiments as previously described. As used in this application, the terms "system" and "device" and "component" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

In one embodiment, the computing architecture 1100 may comprise or be implemented as part of an electronic device. Examples of an electronic device may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

The computing architecture 1100 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1100.

As shown in FIG. 11, the computing architecture 1100 comprises a processing unit 1104, a system memory 1106 and a system bus 1108. The processing unit 1104 can be any of various commercially available processors. Dual microprocessors and other multi processor architectures may also be employed as the processing unit 1104. The system bus 1108 provides an interface for system components including, but not limited to, the system memory 1106 to the processing unit 1104. The system bus 1108 can be any of several types of bus structure that may further interconnect to a memory bus (with or without a memory controller), a peripheral bus, and a local bus using any of a variety of commercially available bus architectures.

The computing architecture 1100 may comprise or implement various articles of manufacture. An article of manufacture may comprise a computer-readable storage medium to store various forms of programming logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of programming logic may include executable computer program instructions implemented using any suitable type of code, such as source code, compiled code, interpreted code, executable code, static code, dynamic code, object-oriented code, visual code, and the like.

The system memory 1106 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE-PROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 11, the system memory 1106 can include non-volatile memory 1110 and/or volatile memory 1112. A basic input/output system (BIOS) can be stored in the non-volatile memory 1110.

The computer 1102 may include various types of computer-readable storage media in the form of one or more lower speed memory units, including an internal hard disk drive (HDD) 1114, a magnetic floppy disk drive (FDD) 1116 to read from or write to a removable magnetic disk 1118, and an optical disk drive 1120 to read from or write to a removable optical disk 1122 (e.g., a CD-ROM or DVD). The HDD 1114, FDD 1116 and optical disk drive 1120 can be connected to the system bus 1108 by a HDD interface 1124, an FDD interface 1126 and an optical drive interface 1128, respectively. The HDD interface 1124 for external drive implementations can include at least one or both of Universal Serial Bus (USB) and IEEE 1294 interface technologies.

The drives and associated computer-readable media provide volatile and/or nonvolatile storage of data, data structures, computer-executable instructions, and so forth. For example, a number of program modules can be stored in the drives and memory units 1110, 1112, including an operating system 1130, one or more application programs 1132, other program modules 1134, and program data 1136.

A user can enter commands and information into the computer 1102 through one or more wire/wireless input devices, for example, a keyboard 1138 and a pointing device, such as a mouse 1140. Other input devices may include a microphone, an infra-red (IR) remote control, a joystick, a game pad, a stylus pen, touch screen, or the like. These and other input devices are often connected to the processing unit 1104 through an input device interface 1142 that is coupled to the system bus 1108, but can be connected by other interfaces such as a parallel port, IEEE 1294 serial port, a game port, a USB port, an IR interface, and so forth.

A monitor 1144 or other type of display device is also connected to the system bus 1108 via an interface, such as a video adaptor 1146. In addition to the monitor 1144, a computer typically includes other peripheral output devices, such as speakers, printers, and so forth.

The computer 1102 may operate in a networked environment using logical connections via wire and/or wireless communications to one or more remote computers, such as a remote computer 1148. The remote computer 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wire/wireless connectivity to a local area network (LAN) 1152 and/or larger networks, for example, a wide area network (WAN) 1154. Such LAN and WAN networking environments are commonplace in offices and companies, and facilitate enterprise-wide computer networks, such as intranets, all of which may connect to a global communications network, for example, the Internet.

When used in a LAN networking environment, the computer 1102 is connected to the LAN 1152 through a wire and/or wireless communication network interface or adaptor 1156. The adaptor 1156 can facilitate wire and/or wireless communications to the LAN 1152, which may also include a wireless access point disposed thereon for communicating with the wireless functionality of the adaptor 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wire and/or wireless device, connects to the system bus 1108 via the input device interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The embodiments, as previously described, may be implemented using various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

In some embodiments, an element is defined as a specific structure performing one or more operations. It may be appreciated, however, that any element defined as a specific structure performing a specific function may be expressed as a means or step for performing the specified function without the recital of structure, material, or acts in support thereof, and such means or step is meant to cover the corresponding structure, material, or acts described in the detailed description and equivalents thereof. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a processor circuit; and
an adaptive access module operable on the processor circuit to adaptively adjust a backoff window size used for access signaling to a radio network during an access period based on access loading estimates of a random access load from multiple machine to machine (M2M) devices in communication with the radio network, the backoff window size comprising a wait time for retry of transmission by two or more M2M devices when a collision occurs between communications from the two or more M2M devices, the adaptive access module operable on the processor circuit to schedule a broadcast of one or more messages to a group of M2M devices for use in accessing the radio network, the one or more messages to include an initial ranging backoff start field with an initial backoff window size value.

2. The apparatus of claim 1, the one or more messages to comprise paging advertisement messages.

3. The apparatus of claim 1, the adaptive access module operable to increase the backoff window size when access loading estimates increase, and decrease the backoff window size when access loading estimates decrease.

4. The apparatus of claim 1, the adaptive access module operable on the processor circuit to determine access loading $\lambda(t)$ according to:

$$\lambda(t) = \alpha * \frac{M(t)}{N(t)}$$

where M(t) is the total number of ranging channels being used in an access window t,
where N(t) is the total number of available ranging channels in an access window t, and
where $\alpha$ is a weight coefficient constant.

5. The apparatus of claim 4,
the adaptive access module operable on the processor circuit to measure M(t) based upon random access code received over an air interface during the access window t.

6. The apparatus of claim 4,
the adaptive access module operable on the processor circuit to measure N(t) by counting random access resource available in the access window t.

7. The apparatus of claim 4,
the adaptive access module operable on the processor circuit to determine an average access loading estimation $\lambda_{avg}$ according to $$\lambda_{avg}(T_k) = \text{mean}(\lambda(t)), t \in [t_0, \ldots, t_0+T_k], k=0,1,\ldots.$$

8. The apparatus of claim 1, the adaptive access module operable on the processor circuit to adjust an initial backoff window size based upon a target access success ratio $r_{target}$ and an expected access success ratio r as a function of access loading $\lambda(t)$ for one or more initial backoff window sizes.

9. The apparatus of claim 8, the adaptive access module operable on the processor circuit to:
determine average access loading $\lambda_{avg}(T-1)$ in a period T−1;
set $r_{target}$ for a period T;
calculate r as a function of $\lambda(t)$ for each of multiple values of initial backoff window;
determine a value of r at $\lambda_{avg}(T-1)$ for one or more values of initial backoff window; and select an initial backoff window size based upon a comparison of r to $r_{target}$.

10. The apparatus of claim 1, comprising a high power antenna to broadcast the initial backoff window size to the radio network.

11. At least one non-transitory computer-readable storage medium comprising a plurality of instructions that, when executed, cause a system to:
adaptively adjust a backoff window size used for access signaling to a radio network during an access period based on access loading estimates of a random access load from multiple machine to machine (M2M) devices in communication with the radio network, the backoff window size comprising a wait time for retry of transmission by two or more M2M devices when a collision occurs between communications from the two or more M2M devices; and
schedule a broadcast of one or more messages to a group of M2M devices for use in accessing the radio network, the one or more messages to include an initial ranging backoff start field with an initial backoff window size value.

12. The at least one non-transitory computer-readable storage medium of claim 11, the one or more messages to comprise paging advertisement messages.

13. The at least one non-transitory computer-readable storage medium of claim 11 comprising a plurality of instructions that, when executed, cause a system to increase the backoff window size when access loading estimates increase, and decrease the backoff window size when access loading estimates decrease.

14. The at least one non-transitory computer-readable storage medium of claim 11 comprising a plurality of instructions that, when executed, cause a system to determine access loading $\lambda(t)$ according to:

$$\lambda(t) = \alpha * \frac{M(t)}{N(t)}$$

where M(t) is the total number of ranging channels being used in an access window t, where N(t) is the total number of available ranging channels in an access window t, and where $\alpha$ is a weight coefficient constant.

15. The at least one non-transitory computer-readable storage medium of claim 14 comprising a plurality of instructions that, when executed, cause a system to measure M(t) based upon random access code received over an air interface during the access window t.

16. The at least one non-transitory computer-readable storage medium of claim 14 comprising a plurality of instructions that, when executed, cause a system to measure N(t) by counting random access resource available in the access window t.

17. The at least one non-transitory computer-readable storage medium of claim 14 comprising a plurality of instructions that, when executed, cause a system to determine an average access loading estimation $\lambda_{avg}$ according to $$\lambda_{avg}(T_k) = \text{mean}(\lambda(t)), t \in [t_0, \ldots, t_0 + T_k], k = 0, 1, \ldots$$

18. The at least one non-transitory computer-readable storage medium of claim 11 comprising a plurality of instructions that, when executed, cause a system to adjust an initial backoff window size based upon a target access success ratio $r_{target}$ and an expected access success ratio r as a function of access loading $\lambda(t)$ for one or more initial backoff window sizes.

19. The at least one non-transitory computer-readable storage medium of claim 17 comprising a plurality of instructions that, when executed, cause a system to:
determine average access loading $\lambda_{avg}(T-1)$ in a period T−1;
set $r_{target}$ for a period T;
calculate r as a function of $\lambda(t)$ for each of multiple values of initial backoff window;
determine a value of r at $\lambda_{avg}(T-1)$ for one or more values of initial backoff window; and
select an initial backoff window size based upon a comparison of r to $r_{target}$.

* * * * *